(12) United States Patent
Yustick et al.

(10) Patent No.: US 7,686,387 B2
(45) Date of Patent: Mar. 30, 2010

(54) REINFORCING SLEEVE FOR A TUBULAR BEAM

(75) Inventors: Robert Franklin Yustick, West Bloomfield, MI (US); Richard Kip Mushisky, Monroe, MI (US); Gregg John Davies, Gibraltar, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 11/846,194

(22) Filed: Aug. 28, 2007

(65) Prior Publication Data

US 2009/0060675 A1 Mar. 5, 2009

(51) Int. Cl.
B62D 21/00 (2006.01)
(52) U.S. Cl. .................................. 296/205; 296/30
(58) Field of Classification Search ............... 296/29, 296/30, 187.12, 193.06, 203.01, 203.03, 296/204, 205, 209, 146.11; 403/379.4, 379.5, 403/379.3
See application file for complete search history.

(56) References Cited

U.S. PATENT DOCUMENTS

| | | | |
|---|---|---|---|
| 765,139 A | 7/1904 | Hirsch | |
| 2,060,970 A | 11/1936 | Belden | |
| 2,499,315 A | 2/1950 | Johnson | |
| 2,827,254 A * | 3/1958 | Faber | ........................ 248/243 |
| 3,556,445 A | 1/1971 | Werner | |
| 3,643,320 A | 2/1972 | Werner | |
| 3,909,905 A | 10/1975 | Giordano | |
| 5,259,660 A * | 11/1993 | Haesters | ..................... 296/204 |
| 5,259,689 A | 11/1993 | Arand et al. | |
| 5,269,584 A * | 12/1993 | Takagi | ......................... 296/30 |
| 6,062,785 A | 5/2000 | McDermott | |
| 6,990,731 B2 | 1/2006 | Haytayan | |
| 2003/0175129 A1 | 9/2003 | Iizuka et al. | |

OTHER PUBLICATIONS

General Specifications, Assembly Information, Mechanical and Performance Requirements for ISO Metric Threaded Spring Nuts, Ford Worldwide Fastener Standard, Oct. 1, 1996, 1 page.

* cited by examiner

*Primary Examiner*—Patricia L Engle
*Assistant Examiner*—Sunsurraye Westbrook
(74) *Attorney, Agent, or Firm*—Frederick Owens; Brooks Kushman P.C.

(57) ABSTRACT

A tubular beam assembly having a tubular member with first and second spaced apart sides and an internal portion. The first side has an insertion opening and a first fastener receiving opening that open into each other. The second side has a second fastener receiving opening and a shoulder defining opening that open into each other. A reinforcement sleeve includes a fastener receiving sleeve portion and a protrusion that supports the reinforcement sleeve in a fastener receiving position within the internal portion of the tubular member. The protrusion is supported by one or both of the insertion opening and the shoulder defining opening. The fastener receiving sleeve portion is aligned with the first and second fastener receiving openings when the reinforcement sleeve is in the fastener receiving position.

12 Claims, 6 Drawing Sheets

REINFORCING SLEEVE FOR A TUBULAR BEAM

BACKGROUND OF THE INVENTION

1. Field of the Invention

The field to which this invention relates is that of attaching reinforcing sleeves to tubular beams.

2. Background Art

Attaching heavy components to tubular beams, such as those forming an automobile chassis, may require a fastener that extends through the entire beam. Attaching a fastener to two walls of a beam provides more support for the component than merely fastening the component to a single wall of the tubular beam.

Tightening a fastener that extends through the tubular beam can deform the tubular beam. A compressive force is applied to the walls of the tubular beam as the fastener is tightened that may cause the walls to be deformed and prevent sustainable required torque on the fastener.

A sleeve may be inserted inside the beam to support the walls of the beam against the compressive force exerted by the fastener on the walls of the tubular beam. The sleeve may be assembled to an internal portion of the tubular beam by, for instance, welding the sleeve to each beam. However, some components that are attached to beams are for optional equipment that may not be required. Attaching a sleeve to all beams increases the weight and the cost of the tubular beam. It is, therefore, desirable to have a sleeve that can be assembled to the tubular beam when needed and omitted when not needed.

The invention as disclosed below addresses the above problems and other problems as summarized below.

SUMMARY OF THE INVENTION

In accordance with at least one aspect of the present invention, a tubular beam and selectively attached reinforcing sleeve is provided. The first side of the tubular beam has an insertion opening and a first fastener receiving opening that open into each other. The second side has a second fastener receiving opening and a shoulder defining opening that also open into each other. The reinforcement sleeve includes a fastener receiving sleeve portion and a protrusion that holds the reinforcement sleeve in a fastener receiving position within the tubular member. When the reinforcement sleeve is held in the fastener receiving position, the fastener receiving sleeve portion is aligned with the first and second fastener receiving openings. The protrusion supports the reinforcing sleeve on the insertion opening and the shoulder defining opening. A fastener is inserted through the first fastener receiving opening, the fastener receiving sleeve portion and the second fastener receiving opening.

In at least one implementation, the insertion opening may be wider than the first fastener receiving opening, and the shoulder defining opening may be wider than the second fastener receiving opening. In this configuration, the insertion opening may be large enough to permit insertion of the reinforcement sleeve into the internal portion of the tubular member. The first and second fastener receiving openings are smaller than the reinforcement sleeve. The walls of the tubular member obstruct the reinforcement sleeve from passing through either the first or second fastener receiving openings.

An upper portion of the shoulder defining opening may form a positioning portion that is substantially aligned with and has substantially the same shape as the insertion opening. When configured in this manner, the positioning portion can provide an open space to facilitate the positioning of the reinforcement sleeve into the fastener receiving position.

The reinforcement sleeve may have a plurality of the protrusions. A first protrusion may be disposed in close proximity to a first end of the reinforcement sleeve and may protrude longitudinally outward from the first end. A second protrusion may be disposed in close proximity to a second end of the reinforcement sleeve and may protrude longitudinally outward from the second end. A lower portion of the insertion opening may define an insertion ledge and the lower portion of the shoulder defining opening may define a shoulder ledge. The insertion ledge and the shoulder ledge support the respective first and second protrusions.

The first fastener opening may be disposed below the insertion opening and the second fastener opening may be disposed below the shoulder defining opening. In this configuration, the reinforcement sleeve may be inserted through the insertion opening and lowered into the fastener receiving position. The first protrusion is disposed proximate and protrudes longitudinally outward from a first end of the reinforcement sleeve. The second protrusion may be disposed proximate and protrude longitudinally outward from a second end of the reinforcement sleeve. A portion of the first side may support the reinforcement sleeve in the fastener receiving position by engagement with the first protrusion. A portion of the second side may support the reinforcement sleeve in the fastener receiving position through engagement with the second protrusion.

In other implementations, the reinforcement sleeve may include a projection projecting upwardly and longitudinally outwardly from the reinforcement sleeve. The projection may be disposed at least partially outside of the tubular member when the reinforcement sleeve is disposed in the fastener receiving position. The projection may then engage an outer portion of the tubular member to inhibit the reinforcement sleeve from falling into the internal portion of the tubular member. The projection may project from a top portion of the reinforcement sleeve. The projection may include a perpendicular portion that extends in a direction that is substantially perpendicular to the reinforcement sleeve. The perpendicular portion may be wider than the insertion opening to obstruct it from passing through the insertion opening.

In another embodiment, a reinforcement sleeve for attaching a part to a beam is provided. The beam may have a wall that defines a hollow area into which the reinforcing sleeve may be assembled between a first opening and a second opening in the wall. In this embodiment, the reinforcement sleeve includes a sleeve portion that may be inserted between the first and second openings and a first hanger portion that may be attached to the sleeve portion. The first hanger portion may engage the wall of the beam to hold a first end of the sleeve in alignment with the first opening. A second hanger portion may also be attached to the sleeve portion to engage the wall of the beam to hold a second end of the sleeve in alignment with the second opening. The wall may have a first receptacle adjacent to the first opening to receive the first hanger portion. The wall may also have a second receptacle adjacent to the second opening to receive the second hanger portion. The first receptacle may be formed by an insertion opening through which the reinforcement sleeve may be inserted into the beam. The second receptacle may be formed by a shoulder opening adjacent to the second opening. The first hanger portion may be attached to the sleeve portion in close proximity to a first end of the sleeve portion. The second hanger portion may be attached to the sleeve portion in close proximity to a second end of the reinforcing sleeve.

The reinforcing sleeve may further include a projection attached to the sleeve portion. The projection may engage an outer portion of the wall to prevent the sleeve portion from falling into the hollow area when the reinforcement sleeve is assembled between the first and second openings in the wall.

A method is provided for reinforcing a closed hollow beam with a sleeve to prevent deformation of the beam when a component is attached to the beam with a fastener. The sleeve may have at least one tang for supporting the sleeve on the beam. The beam may have a wall that encloses a hollow portion. First and second openings in the wall are spaced apart and aligned with each other. The first and second openings may each have a supporting portion and a fastener receiving portion that is narrower than the supporting portion. The method for reinforcing the closed hollow beam with the sleeve comprises inserting the sleeve into the hollow portion of the beam through the supporting portion of the first opening. The sleeve is positioned to be substantially aligned with the fastener receiving portion of the first and second openings. The sleeve is supported by the tang on the supporting portions of the first and second openings within the hollow portion of the beam. The component is attached to the beam by inserting the fastener through the fastener receiving portion of the first opening, the sleeve, and the fastener receiving portion of the second opening.

An insertion tool may be provided. The insertion tool may be configured to selectively grasp and release the sleeve. The method may further comprise the steps of attaching the sleeve to the insertion tool so that the insertion tool retains the sleeve. The sleeve is inserted into the hollow portion of the beam with the insertion tool. The sleeve is positioned to be substantially aligned with the fastener receiving portion of the first and second openings using the insertion tool. The sleeve is released and the insertion tool is removed.

The insertion tool may have a spring loaded detent or a detent that is activated by a trigger that selectively grasps and selectively releases the sleeve. If so, the method may include the further steps of retaining the sleeve with the detent of the insertion tool when mounting the sleeve on the insertion tool and pulling the trigger of the insertion tool to retract the detent releasing the sleeve from the insertion tool.

DETAILED DESCRIPTION OF THE ILLUSTRATED EMBODIMENT(S)

Reference will now be made in detail to the illustrated embodiments of the present invention which include the best modes of practicing the invention presently known to the inventors. The following descriptions are merely exemplary in nature and in no way intended to limit the invention, its application, or uses. The Figures are not necessarily drawn to scale. Specific details disclosed herein are not to be interpreted as limiting, but merely as a representative basis teaching one skilled in the art to variously employ the present invention.

Figure 1:
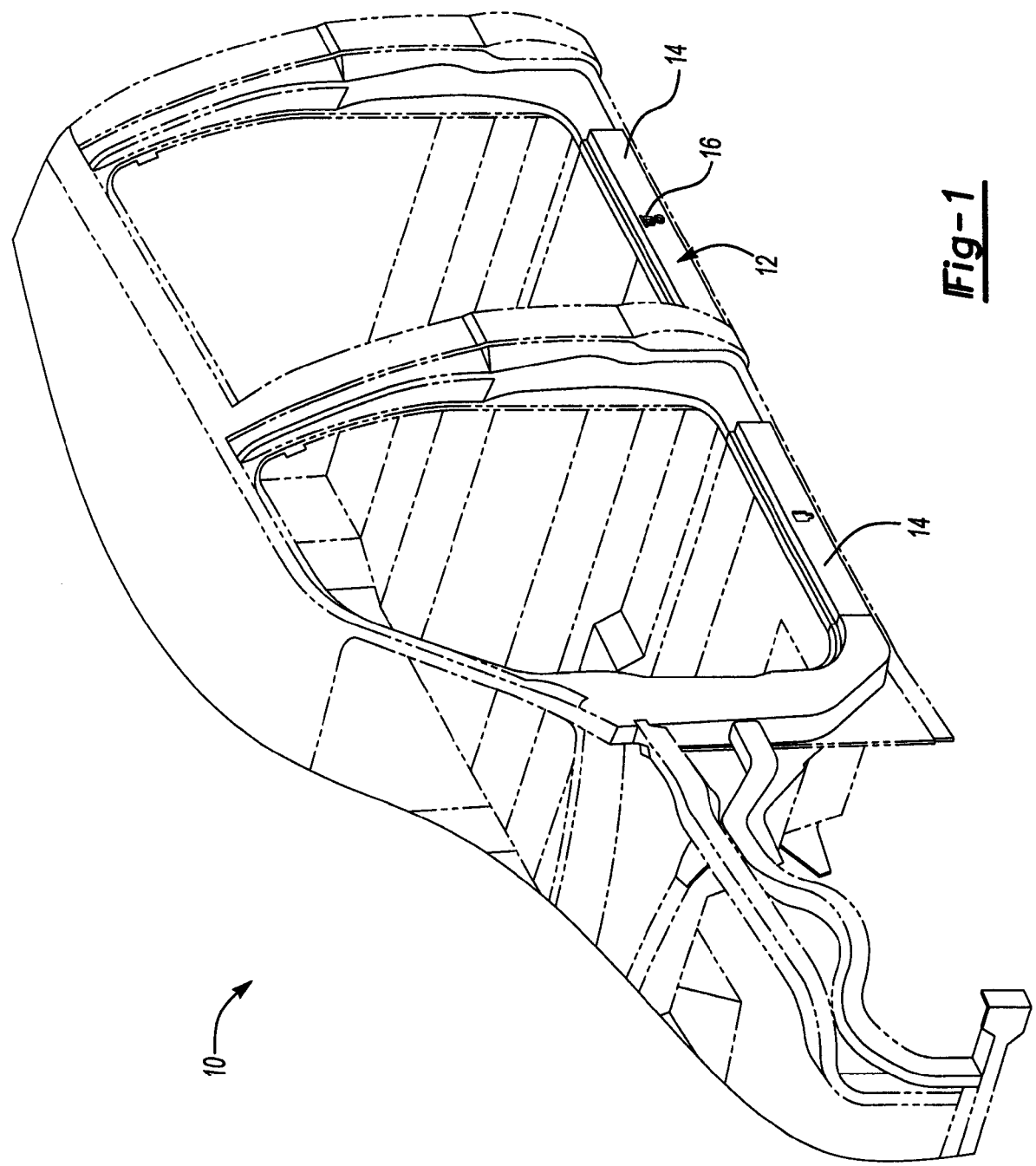
FIG. 1 is a perspective fragmentary view of an automobile chassis including a tubular beam that has an opening for receiving a reinforcement sleeve.

FIG. 1 illustrates an automotive chassis 10 equipped with an embodiment of a tubular beam assembly 12. While the tubular beam assembly 12 is assembled to automotive chassis 10, it should be understood by those of ordinary skill in the art that the tubular beam assembly 12 is not limited to use in automotive applications. Tubular beam assembly 12 may also be used in other vehicles including, without limitation, aircraft, water craft, space craft, and vehicles that travel on rails. Tubular beam assembly 12 may also be used, without limitation, in applications such as residential and commercial building construction, furniture construction, playground equipment and virtually any other application involving securing fasteners inside tubular beams. Tubular beam assembly 12 allows a user to selectively assemble a reinforcement sleeve inside a hollow tubular beam to inhibit the collapse of the tubular beam when a fastener that extends through the tubular beam.

Figure 2:
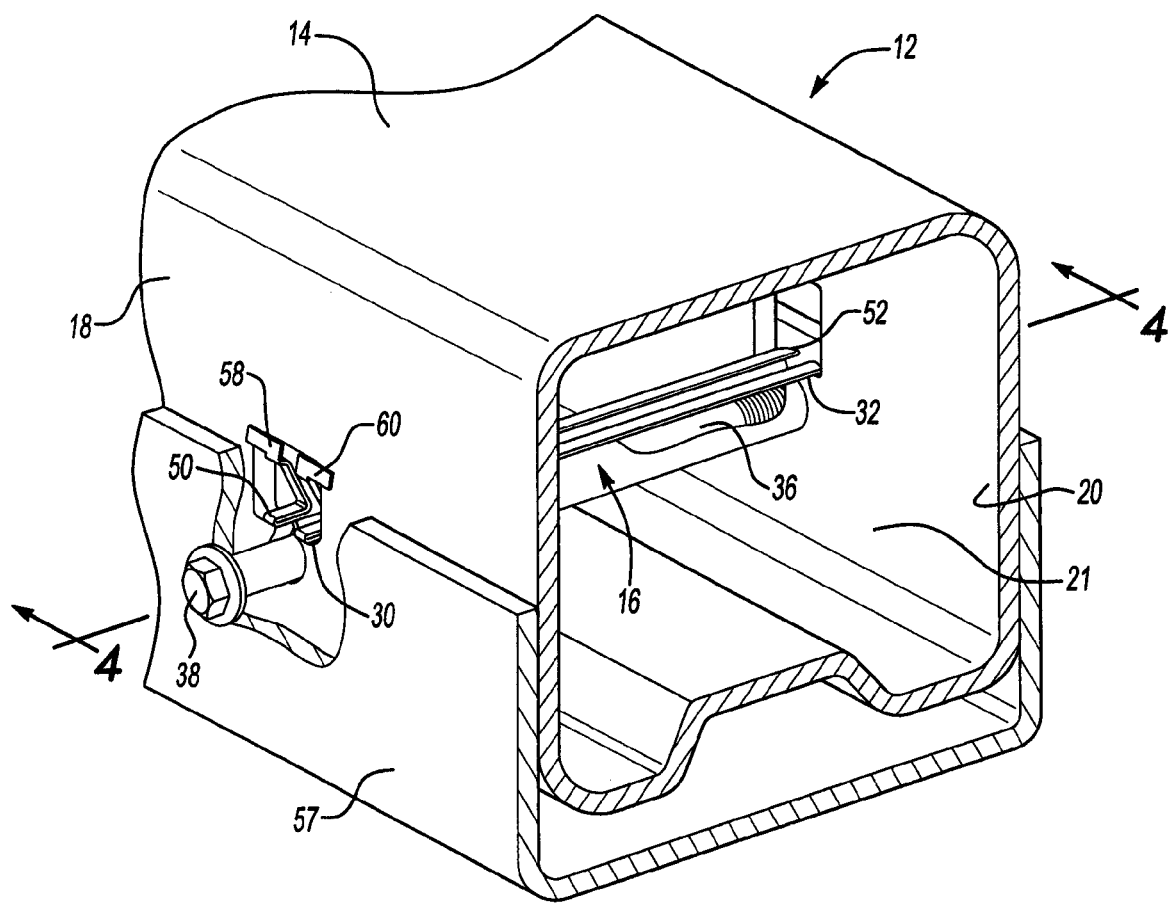
FIG. 2 is an enlarged fragmentary perspective view of a portion of the beam assembly illustrated in FIG. 1 with an attached component in an assembled position.
Figure 3:
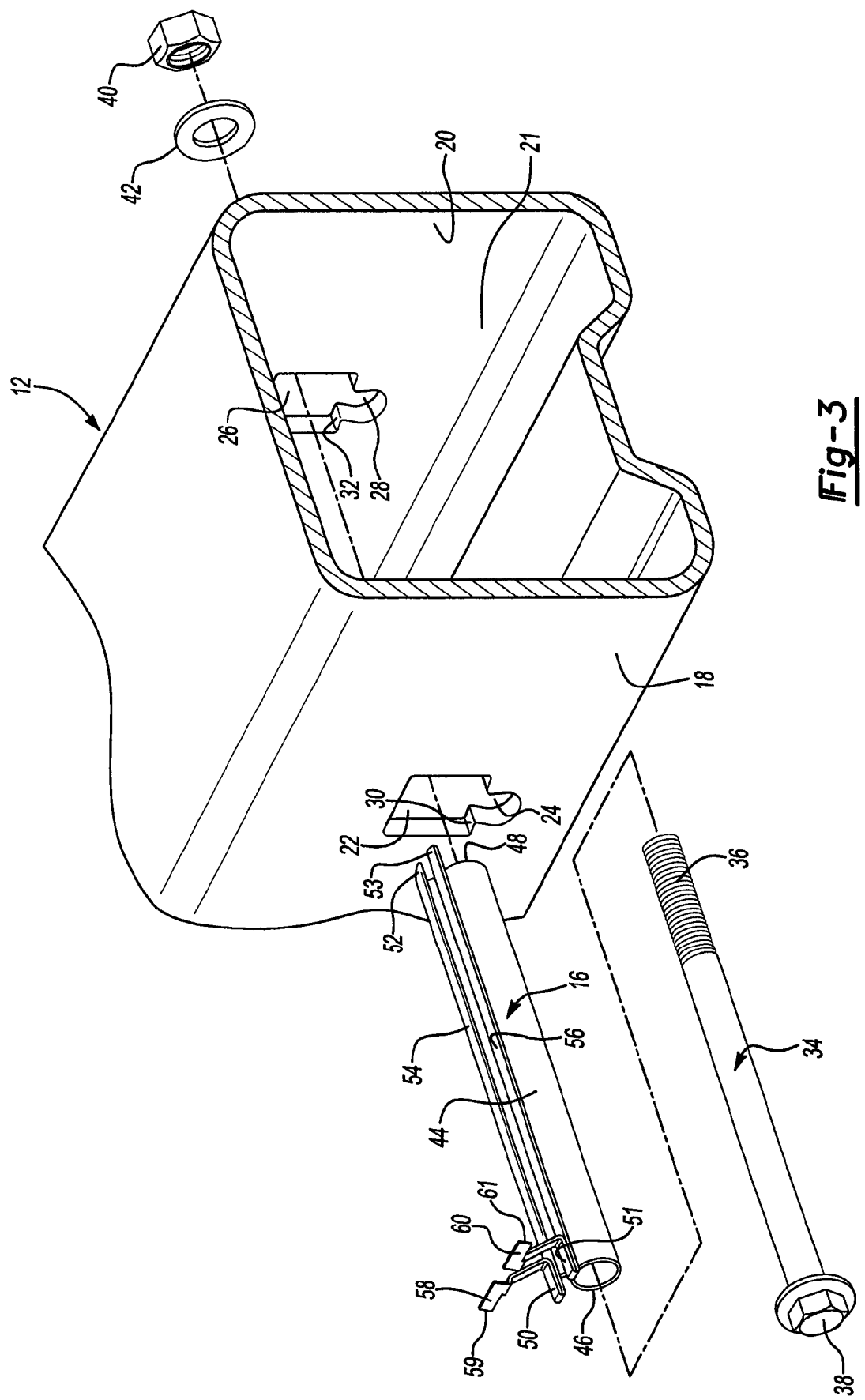
FIG. 3 is an exploded view of the section of the beam assembly illustrated in FIG. 2.

FIG. 2 illustrates a fragmentary perspective view of a portion of the tubular beam assembly 12 of FIG. 1 with an attached component 57 in an assembled position. Attached component 57 has been illustrated in cut-away to reveal details of tubular beam assembly 12. FIG. 3 illustrates an exploded view of the section of the tubular beam assembly 12 illustrated in FIG. 2 without attached component 57. In these views, an interior portion 21 of tubular beam assembly 12 is visible. Tubular beam assembly 12 includes a tubular member 14 and a reinforcement sleeve 16. Tubular member 14 may be made of any suitable material including, without limitation, steel and aluminum. Reinforcement sleeve 16 may be made of any suitable material including, without limitation, steel and aluminum.

Referring to FIGS. 2 and 3, tubular member 14 includes a first side 18 and a second side 20 spaced apart from first side 18 and a substantially hollow internal portion or area 21. Tubular member 14 also includes an insertion opening 22 and a first fastener receiving opening 24 defined within first side 18. Tubular member 14 further includes a shoulder defining opening 26 and a second fastener receiving opening 28 defined within second side 20. Tubular member 14 is illustrated as having a generally rectangular cross section. It should be understood by those of ordinary skill in the art that tubular member 14 may have other cross sectional geometry such as, without limitation, square, circular, and irregularly shaped cross sections.

Insertion opening 22 is wider than first fastener receiving opening 24. Shoulder defining opening 26 is wider than second fastener receiving opening 28. Opening 26 is typically larger than opening 28 to facilitate the alignment of the sleeve insertion tool, however, opening 26 is small enough to act as a stop for the sleeve facilitating proper positioning of the sleeve. While insertion opening 22 and first fastener receiving opening 24 are illustrated as distinct, adjoined openings, one of ordinary skill in the art will appreciate that a single opening that is relatively wide on one side and relatively narrow on an opposite side may also be utilized without departing from the teachings of the present invention. For example, a triangular shaped opening may be employed. The same applies to shoulder defining opening 26 and second fastener receiving opening 28.

An insertion ledge 30 is defined by a lower portion of the insertion opening 22. Similarly, a shoulder ledge 32 is defined by a lower portion of the shoulder defining opening 26. The second fastener receiving opening 28 is disposed generally opposite the first fastener receiving opening 24 for receiving a fastener 34 extending through tubular member 14.

Fastener 34 has a body portion 36 including threads and a head portion 38. In at least one embodiment, the body portion 36 has a diameter that is less than the width of the first and second fastener receiving openings. Head portion 38 has a width that exceeds the width of first fastener receiving opening 24. This dimensional relationship prevents fastener 34 from passing entirely through the first fastener receiving opening 24. Once fastener 34 is disposed within internal portion 21 and extends between the first and second fastener receiving openings 24, 26, fastener 34 may be secured through the use of a nut 40. A washer 42 may be used to space the nut 40 from the second fastener receiving opening 28 and spread the force applied by the nut 40 on the beam 12. While fastener 34 is depicted as a threaded bolt cooperating with a nut, one of ordinary skill in the art will recognize that any suitable fastener may be used.

Reinforcement sleeve 16 includes a fastener receiving sleeve portion 44 having a generally cylindrical shape. The sleeve portion 44 has a diameter that is less than the width of insertion opening 22 but greater than the width of the first and second fastener receiving openings 24 and 28. This configuration permits reinforcement sleeve 16 to be inserted into tubular member 14 through the insertion opening 22 and lowered into an axially aligned position with first and second fastener receiving openings 24 and 28.

Reinforcement sleeve 16 includes a first end 46 and a second end 48 disposed approximately opposite first end 46. The first and second ends 46 and 48 engage the walls of the beam 12 adjacent the inner side of the first and second openings 24 and 28. In this way, the sleeve portion supports the beam 12.

Reinforcement sleeve 16 further includes a first protrusion or hanger portion 50 and a second protrusion or hanger portion 52 disposed proximate the respective first and second ends 46 and 48 of the reinforcement sleeve 16. First protrusion 50 protrudes longitudinally outwardly beyond first end 46 and second protrusion 52 extends longitudinally outwardly beyond second end 48. In the illustrated embodiment, reinforcement sleeve 16 is formed from a single sheet of metal that is formed into the fastener receiving sleeve portion 44, a first flange 54 and a second flange 56. As illustrated, the first and second protrusions 50 and 52 are integral with first flange 54. One of ordinary skill in the art should appreciate that first and second protrusions 50, 52 could alternatively be separately formed and then attached to the fastener receiving sleeve portion 44.

Reinforcement sleeve 16 further includes a pair of anti-fall-in projections 58, 60 projecting upwardly and longitudinally outwardly from the respective first and second flanges 54 and 56. Upper portions of first and second anti-fall-in projections 58 and 60 are oriented transversely with respect to the fastener receiving sleeve portion 44. The respective upper portions of the first and second anti-fall-in projections 58 and 60 extend longitudinally beyond the first end 46 of the reinforcement sleeve 16.

Figure 4:
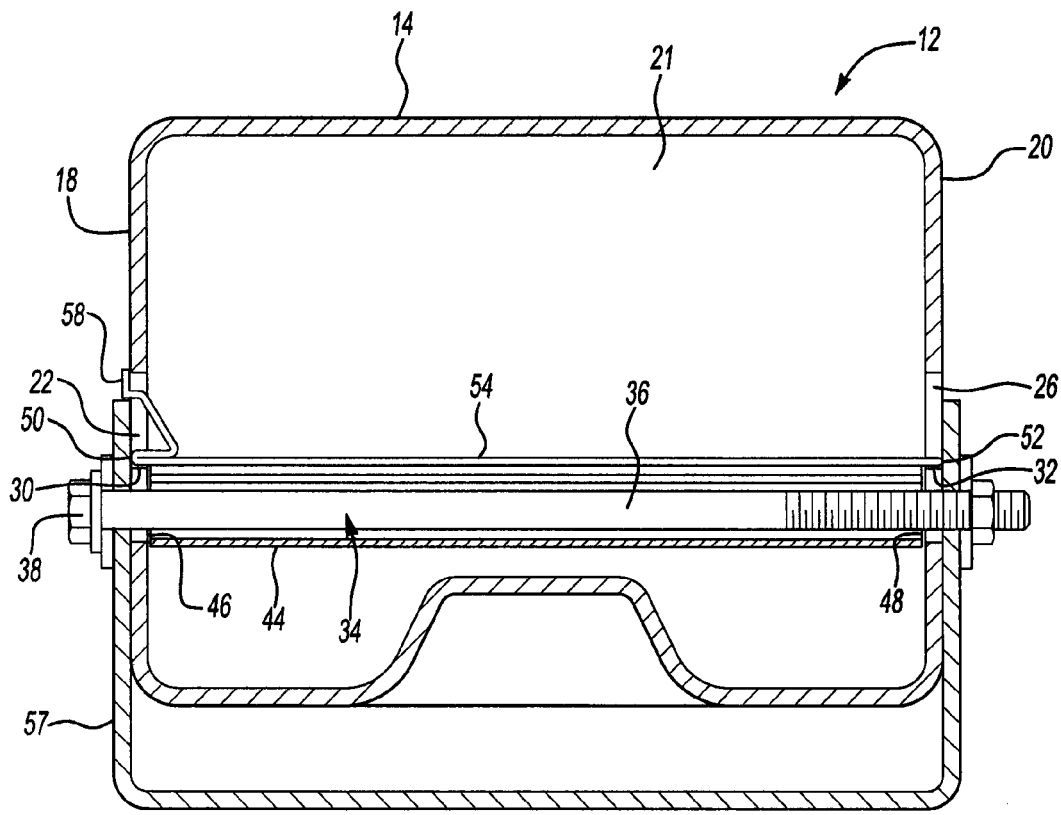
FIG. 4 is a cross sectional view taken along the line 4-4 in FIG. 2.
Figure 5:
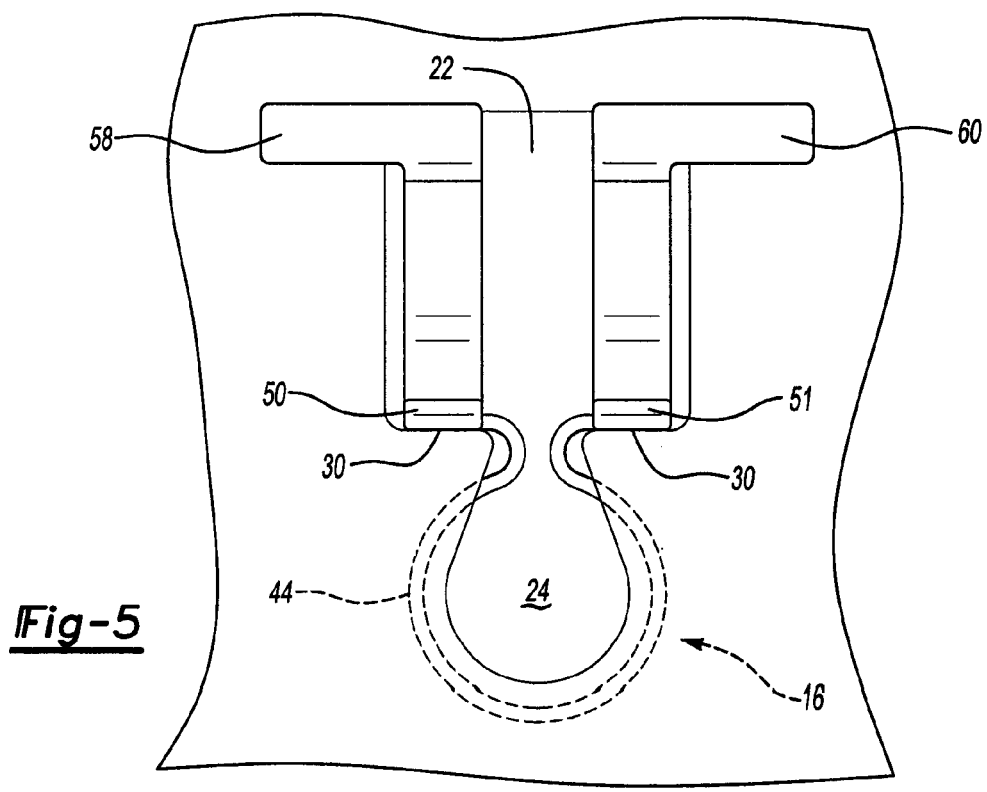
FIG. 5 is a fragmentary side elevational view of the beam assembly illustrated in FIG. 2.

As best illustrated in FIGS. 4 and 5, first and second anti-fall-in projections 58 and 60 prevent reinforcement sleeve 16 from falling into the internal portion 21 as reinforcement sleeve 16 is inserted through insertion opening 22. The distance between a distal end 59 of the first anti-fall-in projection 58 to a proximal end 61 of the second anti-fall-in projection 60 exceeds the width of insertion opening 22. Accordingly, first and second anti-fall-in projections 58 and 60 cooperate to obstruct reinforcement sleeve 16 from passing completely through insertion opening 22.

First and second anti-fall-in projections 58, 60 are illustrated as being integral with first and second flange 54, 56. One of ordinary skill in the art will recognize that first and second anti-fall-in projections 58 and 60 may be separately formed and then attached to fastener receiving sleeve portion 44. Additionally, first and second anti-fall-in projections 58, 60, are illustrated as separate components. In alternate embodiments, first and second anti-fall-in projections 58, 60 may comprise a single anti-fall-in projection whose width exceeds the width of insertion opening 22.

To position reinforcement sleeve 16 as shown in FIG. 2, reinforcement sleeve 16 may be inserted into tubular member 14 through insertion opening 22 until the fastener receiving sleeve portion 44 passes entirely through insertion opening 22. Reinforcement sleeve 16 may then be lowered into a position that is axially aligned with the first and second fastener receiving openings 24 and 28, as shown in FIG. 3. In this position, first protrusion 50 and second protrusion 52 engage insertion ledge 30 and shoulder ledge 32, respectively, to support reinforcement sleeve 16 in a position axially aligned with first and second fastener receiving openings 24 and 28. Additional protrusions, such as third protrusion 51 and fourth protrusion 53, may be included to facilitate the suspension reinforcement sleeve 16 in this position.

One of ordinary skill in the art will appreciate that the first and second fastener receiving openings 24 and 28 need not be positioned below the insertion opening 22 and the shoulder defining opening 26. Rather, the first and second fastener receiving openings 24, 28 may be positioned to the side of the respective insertion opening 22 and shoulder defining opening 26. In such an orientation, a person inserting the reinforcement sleeve 16 into tubular member 14 would insert reinforcement sleeve 16 through the insertion opening 22 and then move reinforcement sleeve 16 to the side. In still other embodiments, the insertion opening 22 and the shoulder defining opening 26 may be positioned below the first and second fastener receiving openings 24 and 28. In this orientation, the person inserting reinforcement sleeve 16 into tubular member 14 would insert reinforcement sleeve 16 through insertion opening 22 and then raise reinforcement sleeve 16 into an axially aligned position adjacent the first and second fastener receiving openings 24 and 28.

When fastening the attached component 57 to tubular member 14, the structural requirements will determine whether the attached component 57 can be attached to one face of the tubular member 14 or whether attached component 57 should be attached to both faces of tubular member 14. Attaching attached component 57 to both faces may be desirable when the load will be relatively heavy. FIG. 2 illustrates one example of how the respective components of the illustrated embodiment may be assembled when attaching an attached component 57. In this view, it may be observed that shoulder defining opening 26 is disposed generally opposite insertion opening 22. This arrangement provides room to maneuver reinforcement sleeve 16 after reinforcement sleeve 16 is inserted through insertion opening 22.

FIG. 4 is a cross sectional view taken along the line 4-4 of FIG. 2 that illustrates the respective positions of the components of tubular beam assembly 12 in their assembled state and attached component 57. Reinforcement sleeve 16 extends through the internal portion 21 of tubular member 14 from first side 18 to second side 20. Attached component 57 is positioned adjacent tubular member 14 and the fastener 34 passes through an opening in attached component 57 and through insertion opening 22. Fastener 34 is received within the fastener receiving sleeve portion 44 and protrudes through the second fastener receiving opening 28, and through an opposite end of attached component 57. Attached component 57 may have in integral nut to receive fastener 34. Alternatively, a separate nut 40 and washer 42 may be utilized. A nut and washer that is integral with, or pre-attached to attached component 57 may be desirable when a back portion of tubular member 14 is inaccessible.

When fastened, fastener 34 is tightened against outer portions of first side 18 and second side 20. First and second ends 46 and 48 of the fastener receiving sleeve portion 44 support internal portions of sides 18 and 20 to inhibit them from collapsing inwardly as fastener 34 is tightened. FIG. 4 also illustrates the cooperation between the first and second protrusions 50, 52 with insertion ledge 30 and shoulder ledge 32, respectively. Additionally, an upper portion of the first anti-fall-in projection 58 can be seen disposed substantially adjacent to an outer portion of first side 18 where it may engage the outer portion of first side 18 to prevent the reinforcement sleeve 16 from falling into internal portion 21.

FIG. 5 is a fragmentary side elevational view of the tubular beam assembly 12 with reinforcement sleeve 16 inserted into the internal portion 21 of the tubular member 14. First and third protrusions 50, 51 engage the insertion ledge 30 to support the fastener receiving sleeve portion 44 in a position substantially axially aligned with first fastener receiving opening 24. First anti-fall-in projection 58 and second anti-fall-in projection 60 are shown in engagement with the first side 18 of the tubular member 14 to prevent the reinforcement sleeve 16 from falling into the internal portion 21. FIG. 5 shows the relationship between the diameter of the fastener receiving sleeve portion 44 (shown in phantom lines) and the first fastener receiving opening 24. The diameter of the fastener receiving sleeve portion 44 exceeds the width of the first fastener receiving opening 24. As a result, the reinforcement sleeve 16 is inhibited from sliding out of the tubular member 14 once the fastener receiving sleeve portion 44 is substantially aligned with the first fastener receiving opening 24. The reinforcement sleeve also supports the tubular member 14, as previously described.

Figure 6:
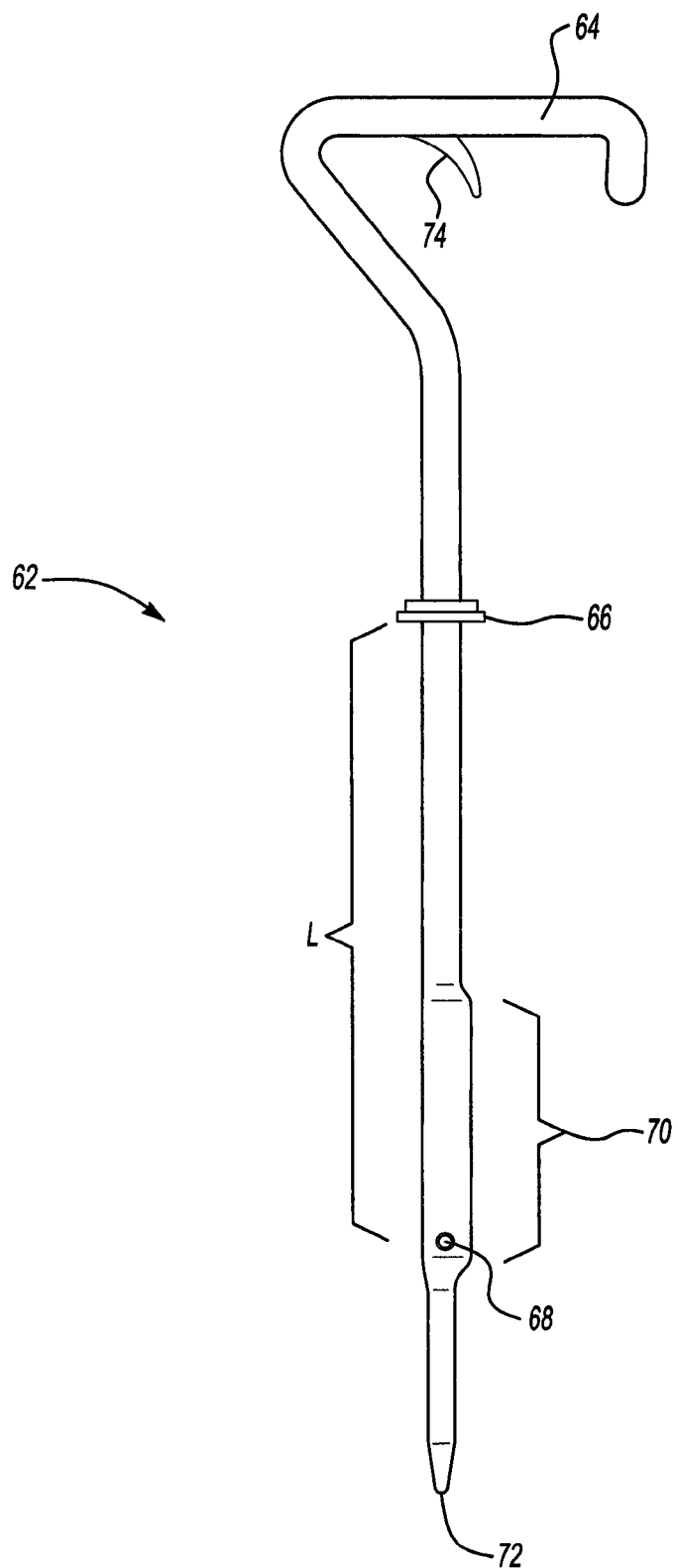
FIG. 6 is an embodiment of an insertion tool which may be used to insert a reinforcing sleeve into a beam.

FIG. 6 illustrates an embodiment of an insertion tool which may be used to insert the reinforcement sleeve 16 into the tubular member 14. The insertion tool 62 has a handle portion 64 to allow manipulation of insertion tool 62 by a user. Reinforcement sleeve 16 may be positioned on the insertion tool 62 such that the first end 46 of the reinforcement sleeve 16 would rest against a back stop 66 and the second end of the reinforcement sleeve 16 would be held in position by a detent 68. The detent may be a spring loaded protrusion that obstructs movement of the reinforcement sleeve 16 until sufficient force is applied to overcome the force of the spring. In other embodiments, a trigger 74 may be included proximate handle portion 64 to allow a user to remotely release the reinforcement sleeve 16 by depressing the trigger 74. The trigger 74 may be operatively connected to the detent 68 by a movable core element (not shown).

In at least one embodiment, the length L from the back stop 66 to the detent would be approximately equal to the length of the reinforcement sleeve 16. To prevent the reinforcement sleeve 16 from dangling loosely on insertion tool 62, a thickened portion 70 may be provided. Thickened portion 70 may have a diameter that is only slightly less than an internal diameter of reinforcement sleeve 16 to more securely hold reinforcement sleeve 16. Insertion tool 62 may further include a rounded end 72 opposite from the handle portion 64.

Rounded end 72 may assist a user in inserting the reinforcement sleeve 16 into tubular member 14 in conditions of limited visibility or access. Rounded end 72 is narrow enough to pass from shoulder defining opening 26 into second fastener receiving opening 28.

Figure 7:
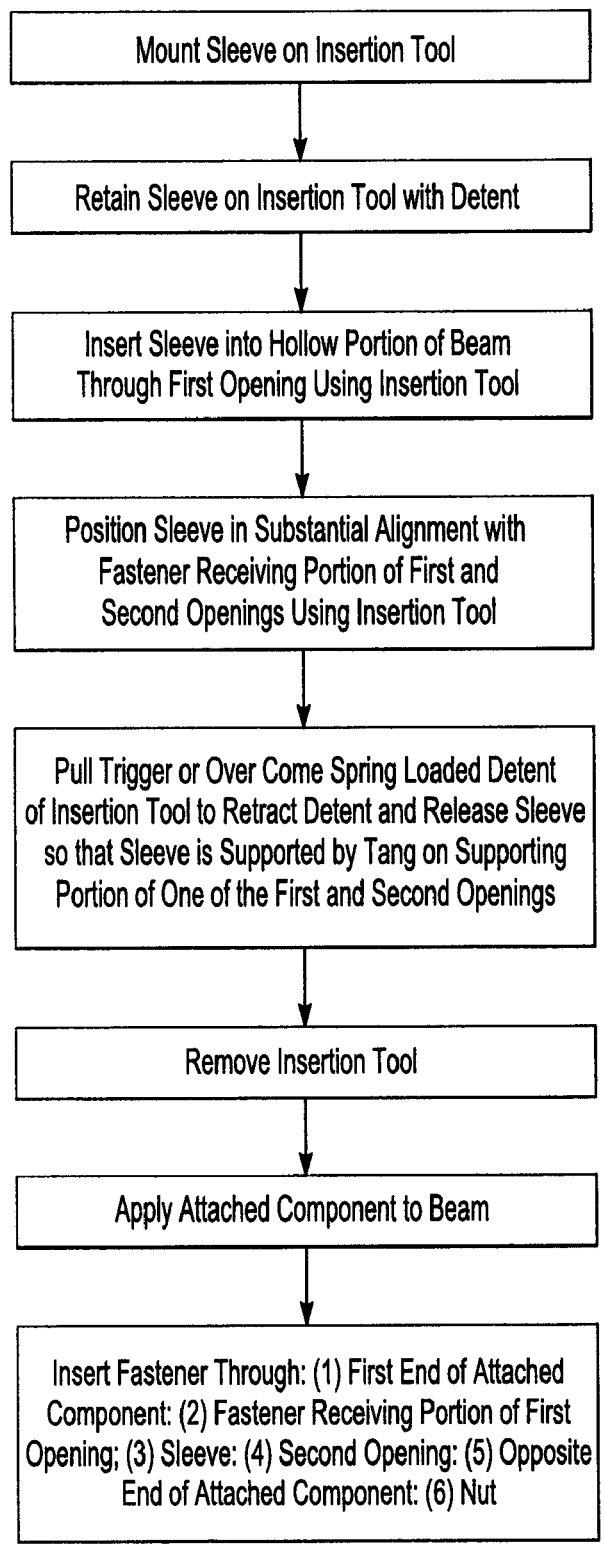
FIG. 7 is a flowchart illustrating an embodiment of a method for inserting a reinforcing sleeve into a beam.

FIG. 7 contains a flowchart illustrating an embodiment of a method for assembling reinforcement sleeve 16 to tubular member 14. A user assembles the reinforcement sleeve 16 onto the insertion tool 62 such that the first end 46 abuts against back stop 66 and second end 48 passes over detent 68 and is prevented from sliding off insertion tool 62 by detent 68.

With the reinforcement sleeve 16 positioned on insertion tool 62, insertion tool 62 is inserted into tubular member 14 through the insertion opening 22. The rounded end 72 can be used to find the shoulder defining opening 26. The insertion tool may be further inserted through the insertion opening 22 until the first end 46 passes through insertion opening 22. Using insertion tool 62, the reinforcement sleeve 16 may be lowered into a position that is substantially aligned with the first and second fastener receiving openings 24 and 28. The first and third protrusions engage the insertion ledge 30 and with the second and fourth protrusions 51 and 53 engaging the shoulder ledge 32. Insertion tool 62 may be pulled out of reinforcement sleeve 16. Enough force should be used to overcome the force exerted by the spring loaded detent 68. If the insertion tool 62 is equipped with trigger 74, then the detent 68 may be retracted using trigger 74. Once the insertion tool 62 is removed from the reinforcement sleeve 16 and from tubular member 14, a component may be attached to the tubular beam assembly 12 by inserting a fastener 34 through the first fastener receiving opening 24, the fastener receiving sleeve portion 44 and the second fastener receiving opening 28.

While the best mode for carrying out the invention has been described in detail, those familiar with the art to which this invention relates will recognize various alternative designs and embodiments for practicing the invention as defined by the following claims.

What is claimed:

1. A tubular beam assembly comprising:
    a tubular member having first and second spaced apart sides and an internal portion, the first side having an insertion opening and a first fastener receiving opening that open into each other, the second side having a second fastener receiving opening and a shoulder defining opening that open into each other;
    a reinforcement sleeve including a fastener receiving sleeve portion and a protrusion that supports the reinforcement sleeve in a fastener receiving position within the internal portion of the tubular member, the fastener receiving sleeve portion being in alignment with the first and second fastener receiving openings when the reinforcement sleeve is disposed in the fastener receiving position, the protrusion being supported by one of the insertion opening and the shoulder defining opening; and
    a fastener inserted through the first fastener receiving opening, the fastener receiving sleeve portion and the second fastener receiving opening.

2. The tubular beam assembly of claim 1 wherein the insertion opening is wider than the first fastener receiving opening, wherein the shoulder defining opening is wider than the second fastener receiving opening, wherein the insertion opening is large enough to permit insertion of the reinforcement sleeve into the internal portion of the tubular member through the insertion opening and wherein the first and second fastener receiving openings are small enough to obstruct the reinforcement sleeve from passing through the first and second fastener receiving openings.

3. The tubular beam assembly of claim 1 wherein an upper portion of the shoulder defining opening forms a positioning portion that is substantially aligned with and that has substantially the same shape as the insertion opening, wherein the positioning portion provides space to facilitate positioning the reinforcement sleeve into the fastener receiving position.

4. The tubular beam assembly of claim 1 wherein the reinforcement sleeve has a plurality of the protrusions, a first of the protrusions being disposed proximate a first end of the reinforcement sleeve and protruding longitudinally outward therefrom, a second of the protrusions being disposed proximate a second end of the reinforcement sleeve and protruding longitudinally outward therefrom, a lower portion of the insertion opening defining an insertion ledge, and a lower portion of the shoulder defining opening defining a shoulder ledge, the insertion ledge and the shoulder ledge supporting the respective first and second protrusions.

5. The tubular beam assembly of claim 1 wherein the insertion opening is wider than the first fastener opening and wherein the shoulder defining opening is wider than the second fastener opening.

6. The tubular beam assembly of claim 1 wherein the first fastener opening is disposed below the insertion opening and wherein the second fastener opening is disposed below the shoulder defining opening whereby the reinforcement sleeve may be lowered into the fastener receiving position after being inserted through the insertion opening.

7. The tubular beam assembly of claim 1 wherein the reinforcement sleeve has a plurality of the protrusions, a first of the protrusions being disposed proximate a first end of the reinforcement sleeve and protruding longitudinally outward therefrom, a second of the protrusions being disposed proximate a second end of the reinforcement sleeve and protruding longitudinally outward therefrom, a portion of the first side supporting the reinforcement sleeve in the fastener receiving position through engagement with the first of the protrusions, a portion of the second side supporting the reinforcement sleeve in the fastener receiving position through engagement with the second of the protrusions.

8. The tubular beam assembly of claim 1 wherein the reinforcement sleeve includes a projection projecting upwardly and longitudinally outwardly from the reinforcement sleeve, the projection being disposed at least partially outside of the tubular member when the reinforcement sleeve is disposed in the fastener receiving position, the projection engaging an outer portion of the tubular member to inhibit the reinforcement sleeve from falling into the internal portion of the tubular member.

9. The tubular beam assembly of claim 8 wherein the projection projects from a top portion of the reinforcement sleeve.

10. The tubular beam assembly of claim 8 wherein the projection includes a perpendicular portion which projects in a direction substantially perpendicular to the reinforcement sleeve.

11. The tubular beam of claim 10 wherein the perpendicular portion is wider than the insertion opening and is obstructed by the perpendicular portion from passing through the insertion opening.

12. The tubular beam assembly of claim 1 wherein the support member is a beam forming a portion of an automotive chassis.

* * * * *